United States Patent
Bristow et al.

(10) Patent No.: US 8,166,126 B2
(45) Date of Patent: Apr. 24, 2012

(54) SYSTEM AND METHOD FOR DISTRIBUTING NOTIFICATIONS TO A GROUP OF RECIPIENTS

(75) Inventors: Lorin Brooks Bristow, Franklin, TN (US); Harold Dean St. Clair, Jr., Nashville, TN (US)

(73) Assignee: Cassidian Communications, Inc., Temecula, CA (US)

( * ) Notice: Subject to any disclaimer, the term of this patent is extended or adjusted under 35 U.S.C. 154(b) by 398 days.

(21) Appl. No.: 11/857,364

(22) Filed: Sep. 18, 2007

(65) Prior Publication Data
US 2009/0077191 A1 Mar. 19, 2009

(51) Int. Cl.
*G06F 15/16* (2006.01)

(52) U.S. Cl. ........ 709/207; 709/203; 709/204; 709/205; 709/218; 709/227; 370/335; 370/352; 379/114.01; 379/88.13

(58) Field of Classification Search .......... 709/203–207, 709/218, 227; 370/335, 352; 379/114.01, 379/88.13
See application file for complete search history.

(56) References Cited

U.S. PATENT DOCUMENTS

| | | | | |
|---|---|---|---|---|
| 4,375,083 A | * | 2/1983 | Maxemchuk | 704/278 |
| 5,287,199 A | * | 2/1994 | Zoccolillo | 358/402 |
| 6,463,462 B1 | | 10/2002 | Smith et al. | |
| 7,069,301 B2 | * | 6/2006 | Jerbi et al. | 709/206 |
| 7,130,389 B1 | | 10/2006 | Rodkey et al. | |
| 2006/0195585 A1 | * | 8/2006 | Samayamantry | 709/227 |

FOREIGN PATENT DOCUMENTS

| | | | |
|---|---|---|---|
| EP | 1 252 747 B | | 7/2007 |
| EP | 1252747 B1 | * | 7/2007 |
| WO | WO 2006/097396 A | | 9/2006 |

OTHER PUBLICATIONS

International Search Report for International application No. PCT/US2008/076708, dated Jan. 21, 2009.

* cited by examiner

*Primary Examiner* — Wing Chan
*Assistant Examiner* — Benjamin M Thieu
(74) *Attorney, Agent, or Firm* — Knobbe Martens Olson & Bear LLP (57) ABSTRACT

Systems and methods by which a user may use a client computing device (such as a mobile phone, for example) to initiate and send a notification message to a selected group of recipients are provided. The notification message may be an audio message that is delivered by various electronic methods including e-mail, text message, and/or voicemail. In defining the notification message, the user is provided with the ability to request a confirmation that the notification message has been received and/or understood by the selected recipients. In some embodiments, recipients are asked to respond to the notification message indicating that they have received and understood the message.

24 Claims, 10 Drawing Sheets

SYSTEM AND METHOD FOR DISTRIBUTING NOTIFICATIONS TO A GROUP OF RECIPIENTS

BACKGROUND OF THE INVENTION

1. Field of the Invention

This application relates to electronic messaging. More particularly, this application is related to a system and method for distributing a notification message to a group of recipients.

2. Description of the Related Technology

The average person today finds himself at the center of a rapidly expanding network of personal contacts and rapid communication is increasingly important. In many situations, a person may find that it is necessary to communicate and share important information with a large group of recipients. For example, a youth sports team coach may suddenly find out that an unscheduled meeting will prevent him from attending a team practice. The task of communicating this information to a large number of persons (e.g., the team members and/or their parents) is a significant and time-consuming challenge which may require telephone calls, text messages and/or e-mails between the coach and the team members. Depending on the size of the group and the complexity of the necessary communications, this process can easily consume hours of time between contacting the first and last person on the team. Moreover, between the first contact and the last contact, changes in status may force the entire process to start again, as new information becomes available and must be communicated to everyone in the group.

SUMMARY OF CERTAIN INVENTIVE ASPECTS

The systems and methods of the development disclosed herein each have several aspects, no single one of which is solely responsible for its desirable attributes. Without limiting the scope of this invention, several of its features will now be discussed briefly.

In a first embodiment, a system for sending and verifying receipt of a notification message to a plurality of recipients over a computer network is provided. The system includes a first module configured to store contact details for potential recipients of the notification message, including an identification of potential recipients and at least one address of potential recipients; to store a voice recording; to receive data identifying one or more of the potential recipients as notification message recipients and specifying message delivery options; and to package the notification message recipients, the stored input voice recording, and the message delivery options into a notification package. The system also includes a second module in communication with the first module which is configured to receive the notification package from the first module and to process the notification package by extracting the notification message recipients, the stored input voice recording and the message delivery options from the notification. The second module is further configured to send the stored input voice recording to the at least one address associated with the one or more notification message recipients; to receive data from one or more of the notification message recipients indicative of confirmation that the message was received and understood; and to send the data indicative of confirmation that the message was received to the first module.

In another embodiment, a method of distributing an electronic message from a first client device to a group of recipients over a network is provided. The method comprises receiving data indicative of the electronic message to be distributed from the first client device and providing a first user-selectable interface element for specifying the group of recipients to receive the electronic message. The method also includes receiving a selection via the user-selectable interface element, the selection specifying the groups of recipients to receive the electronic message, sending the electronic message to a notification service for distribution to the recipients in the specified group, wherein the electronic message comprises data which prompts the recipient to confirm their review of the electronic message, and receiving confirmation of review of the sent electronic message by the recipients on a per recipient basis based the recipient confirming review of the electronic message.

In still another embodiment, a method of managing notifications from a mobile phone to a plurality of recipients is provided. The method includes receiving from a first mobile device a message notification package including contact information and contact instructions, wherein the contact information includes recipient identifiers and recipient address information for the plurality of recipients. The received message notification package is processed by applying the contact instructions to the contact information. The method further includes sending, based on the contact instructions, a message notification to the plurality of recipients and receiving data from one or more of the plurality of recipients indicative of confirmation that the message was received and understood. The mobile phone is then notified that the message was received by the one or more of the plurality of recipients.

BRIEF DESCRIPTION OF THE DRAWINGS

In this description, reference is made to the drawings wherein like parts are designated with like numerals throughout.

DETAILED DESCRIPTION CERTAIN INVENTIVE EMBODIMENTS

Various embodiments described herein comprise systems and methods by which a user may use a client computing device (such as a mobile phone, for example) to initiate and send a notification message to a selected group of recipients.

The notification message may be an audio message that is delivered by various electronic methods including e-mail, text message, and/or voicemail. In defining the notification message, the user is provided with the ability to request a confirmation that the notification message has been received and/or understood by the selected recipients. In some embodiments, recipients are asked to respond to the notification message indicating that they have received and understood the message. Upon receiving the recipients' response, an additional question may be posed by the user to the notification message recipients. Responses to the additional question may be collected and provided to the user. In still other embodiments, the group of recipients may also be transferred to a communications bridge which connects them to a conference call with the notification user.

Figure 1:
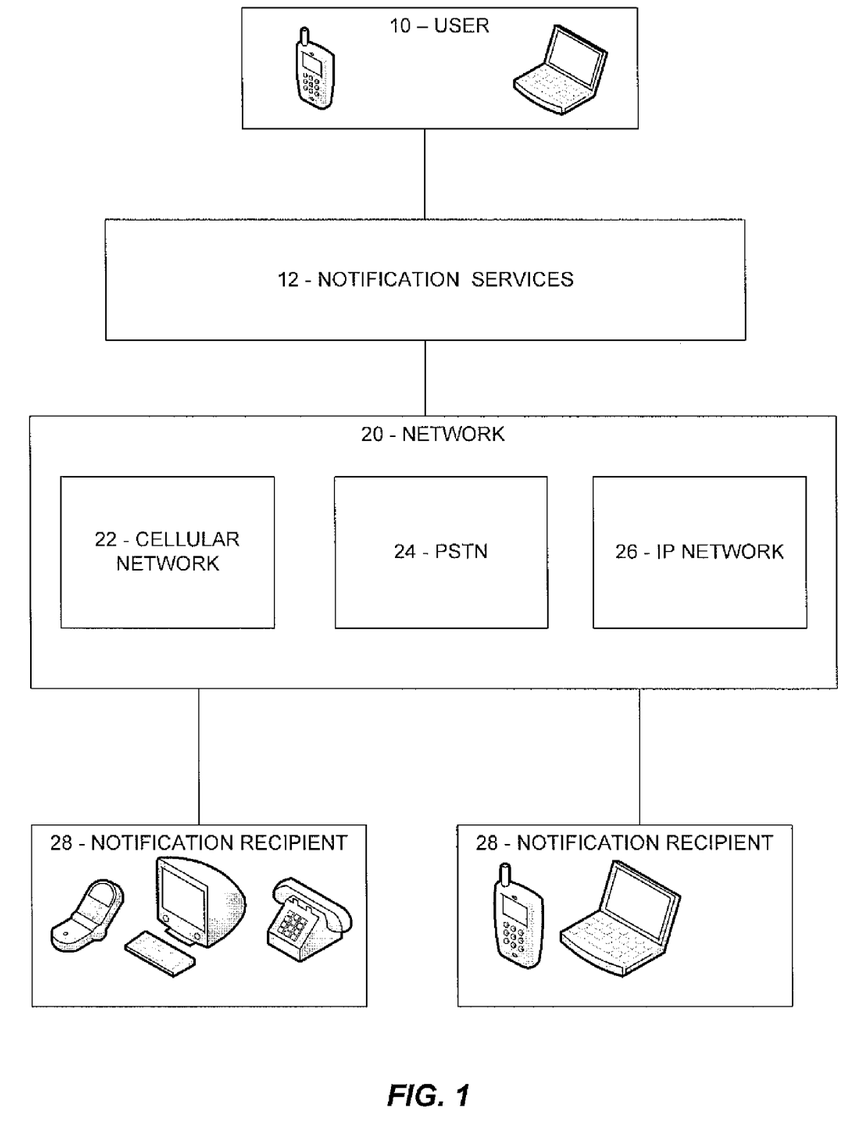
FIG. 1 is a block diagram illustrating an example of a computer network environment suitable for implementation of various aspects of the invention.

FIG. 1 is an example of a network environment which is suitable for implementing various embodiments of the development described herein. The network environment generally includes one or more networks which may be used to communicate messages from one or more sending users 10 to one or more notification recipients 28. The network environment provided in FIG. 1 includes various different types of networks 20. These networks include a cellular network 22, a public switched telephone network (PSTN) 24, and a IP network 26. The network environment may include other types of networks suitable for providing communications capabilities among two or more parties. Connected to the network 20 is notification service 12. The notification service 12, which will be described in detail below, provides a platform which may be used by user 10 to send message notifications to a group of recipients 28.

The user 10 shown in FIG. 1 may possess various ways to communicate access the network 20 via the notification service 12. The user 10 may have a mobile telephone device. The mobile telephone device may take various forms. In one embodiment, the mobile telephone device is a "smartphone" device which provides a mobile operating system (e.g., Windows Mobile, Symbian, or Mobile Linux) which can run software applications installed on the smartphone device. The mobile telephone device may also be a personal data assistant (PDA) device. The user 10 may use the mobile telephone device to send and receive telephone calls over the cellular network 22. The mobile telephone device may further be configured to access the IP network 26 and provide Internet capability to the user 10. The user 10 may also possess other communications devices such as one or more personal computers (including laptop computers, handheld computers, tablet computers and the like). The user 10 may also utilize these devices to access the network 20.

Also connected to the network 20 are notification recipients 28. As will be discussed in additional detail below, the notification recipients include persons stored in the contact information associated with the user 10. Notification recipients 28 are typically persons who may be contacted via the network 20. A notification recipient 28 may be contacted in various ways by sending a message to one of the addresses of the notification recipient. As used herein, an address refers to any text, digits, or combination thereof which is used to contact a notification recipient. Addresses may include e-mail addresses, phone numbers, instant messaging addresses, Skype addresses, VOIP addresses, and the like. For example, a notification recipient 28 may have a telephone (with an associated telephone number/address) connected to the PSTN 24. A notification recipient 28 may also have a mobile telephone (with an associated telephone number/address) which is connected to the cellular network 22. A notification recipient 28 may also have one or more e-mail addresses which are accessed by an Internet enabled computing device such as a personal computer (or possibly a mobile phone).

Figure 2:
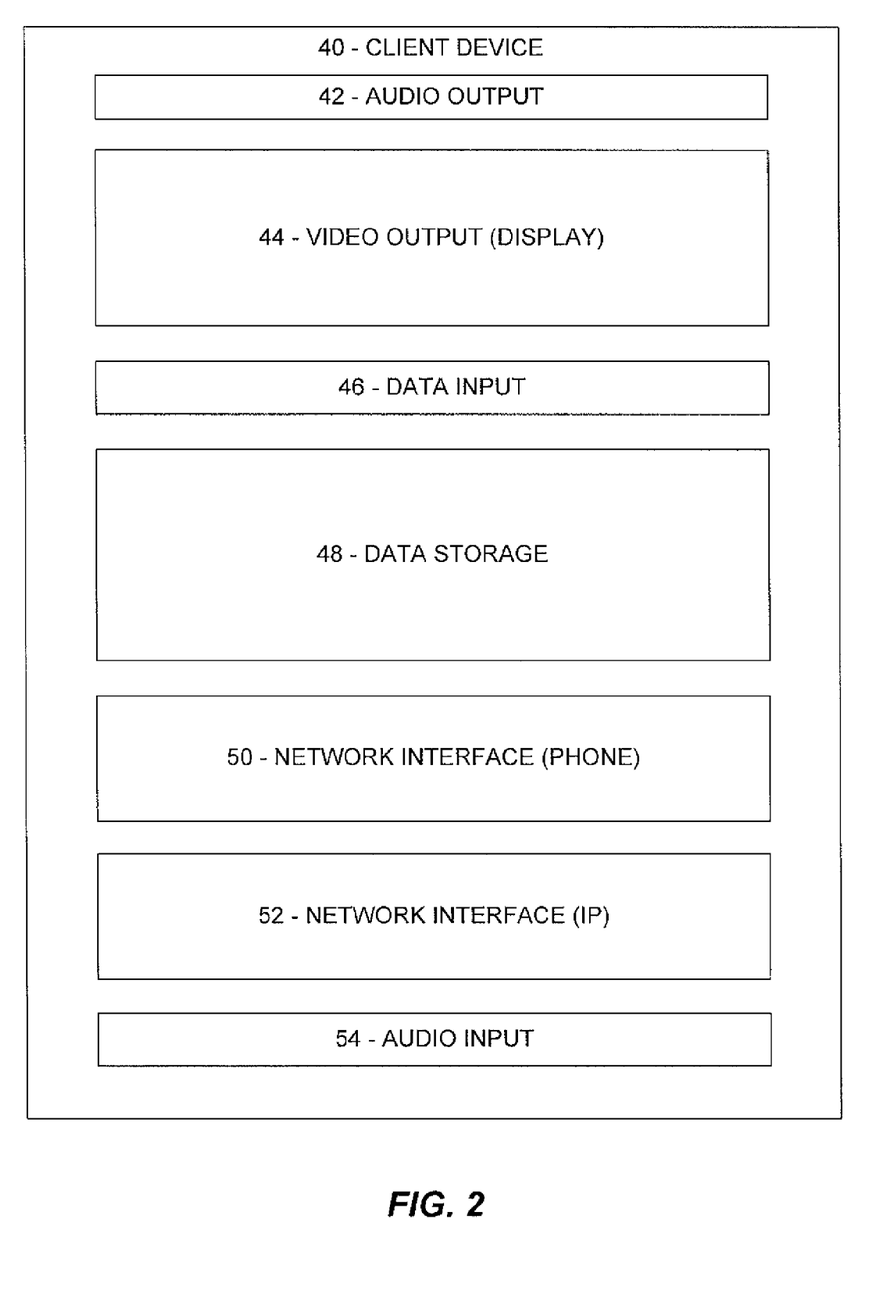
FIG. 2 is a block diagram of a client device which may be used to access the notification service from FIG. 1.

Referring now to FIG. 2, an example of a client device 40 is provided. As will be described in detail below, the client device 40 is used by user 10 to initiate a notification message to a group of notification recipients 28. The client device 40 may take various forms and need only have the capability of communicating with notification service 12 as described below. In the example provided, the client device 40 is a smartphone. The client device 40 may include an audio output 42 (such as an output speaker) which outputs sound to the user 10. The client device also may include a video output 44 such as a video display which is used to display text and/or graphical information to the user 10. Also included with the client device 40 is a data input device 46. The data input device 46 may take various forms. It may be a stylus which is used in conjunction with the video output 44 to input data. It may also be a keyboard or a mouse (or a combination of the two).

The client device 40 also will typically include data storage 48. The data storage 48 may be a volatile memory, a non-volatile computer memory, or some combination of the two. As will be further discussed below in connection with FIG. 3, the data storage 48 may be used to store application software, operating system software, and application data. The client device 40 may further include one or more network interfaces 50. The network interface 50 may be used to connect to and interface with one of the networks 20 such as the cellular network 22, for example. The device 40 may further include an additional network interface 52 which connects to another network such as the IP network 26 for example. In some embodiments, the client device may include a single network interface which is able to communicate with more than one network 20. The client device 40 will typically also include an audio input 54. The audio input 54 may be a microphone or some other input device which receives sounds. The sound received via the audio input 54 may be stored in the data storage 48 as a digital sound file. Alternatively, the input sound may be stored in some other medium.

Figure 3:
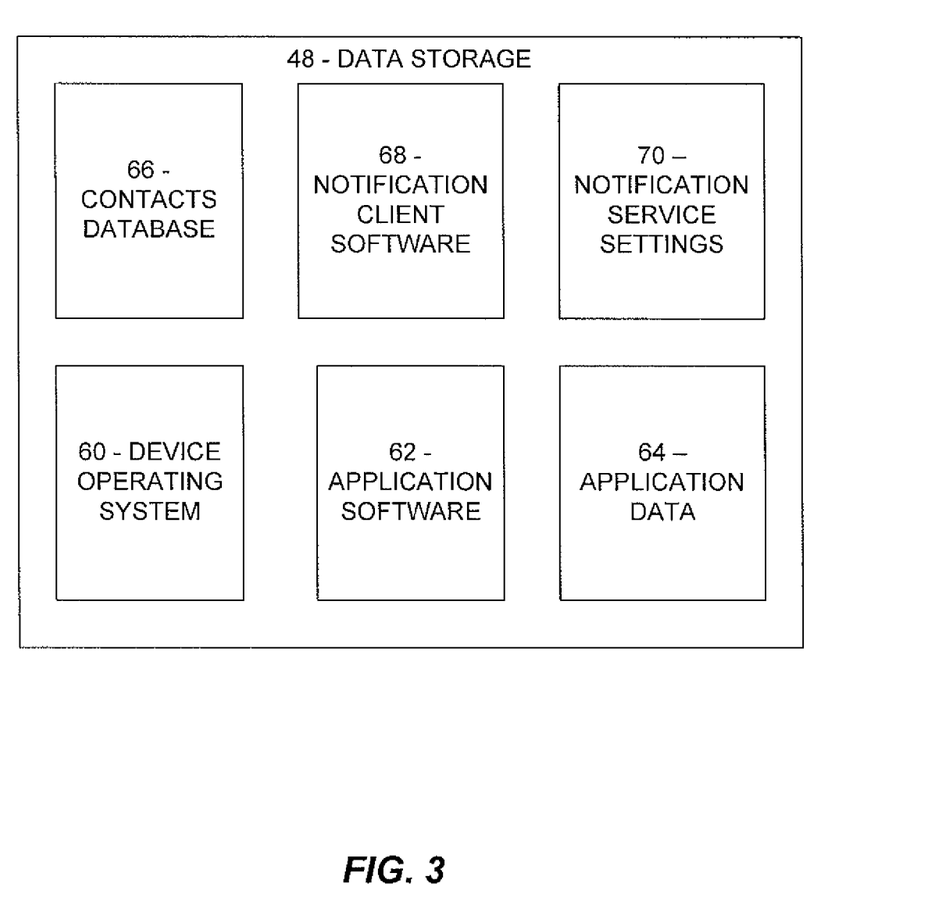
FIG. 3 is a more detailed block diagram view of the data storage from FIG. 2.

Referring now to FIG. 3, a more detailed view of the data storage 48 is provided. The data storage 48 may have various types of data stored on it. For example, the data storage 48 may include a device operating system 60. As noted above, the device operating system 60 may be a mobile operating system such as Windows Mobile, Symbian, Mobile Linux, or the like. The device operating system may also be a more proprietary phone operating system configured to run with a application platform such as Java (J2ME). Also stored in the data storage may be application software 62. Application software 62 may be preinstalled on the device 40 or it may be downloaded and installed to the device at a later time. The application software 62 typically is configured to run on top of the operating system 60. Also stored in data storage 48 is application data 64. The application data 64 is typically data generated by one of the software application 62. Application data 64 may include documents, spreadsheets, databases, and the like.

Data storage 48 may also have a contacts database 66. The contacts database 66 stores the user's 10 contacts in the client device 40. The contacts database 66 may be the contacts database that is preinstalled on device 40, or it may be a provided via add-on software that is installed at a later time. A more detailed example of a contacts database is provided below in connection with FIG. 4. The client device 40 may also include notification client software 68. The notification client software 68 is the software which is used by the user 10 to initiate notifications in accordance with various aspects of the invention. The notification client software 68 may be a software application written to run directly on top of the operating system 60, or alternatively, it may be a Java application or a browser-based application. The operation of the notification client software 68 is described in further detail below.

The data storage 48 may also include notification service settings 70. The notification service settings 70 may set the level of service the user 10 has requested from the notification service 12. The functionality of the notification client software 68 may be determined in part by the notification service settings 70. These settings may include various levels of account service. Although notification service settings 70 may be stored locally in the data storage 48, it should be appreciated that service level may be governed by data stored at the notification service 12. Service level information may be cached locally on the client device 40 in order to improve user interface responsiveness. If the account service level stored on the client device 40 is modified in a manner not authorized (e.g. hacked by the end user), the settings maintained at the notification service 12 may be configured to overwrite the modified settings in the client device 40. For example, one level of account service may specify whether the user 10 has the ability to request confirmation from the notifications recipients 28 that a message has been received. The settings may further include whether the user 10 can append an additional question to a notification message, or whether notification recipients 28 should be bridged into a telephone conference call with the user 10 once they have received and responded to the user 10. Other data may also be stored in the notification service settings 70. For example, default settings for the user's 10 account (such as caller identification to display to notification recipients, or default message format) may be stored in the service settings 70 and be accessed by the notification client software 68 when initiating a notification message to notification message recipients 28.

Figure 4:
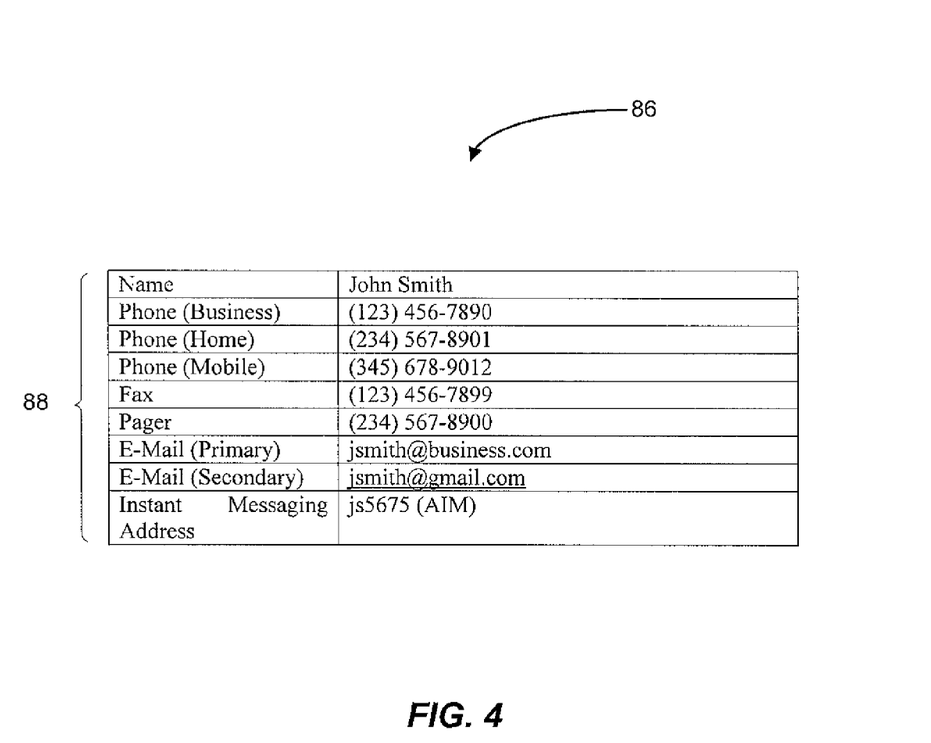
FIG. 4 is a more detailed view of the contacts database from FIG. 3.

Referring now to FIG. 4, an example of a record 86 from a contacts database 66 is provided. The contacts database 66 may take various forms. In one embodiment, the contacts database 66 may be stored in a relational database or some other data structure, such as a flat file or object store, for example. In the example provided in FIG. 4, the contacts database 66 is a relational database table with several fields. Turning to the database record 86 itself, the record includes various data fields 88 which store contact information for a notification recipient 28. The data fields 88 may include a name field which describes the person associated with the contact record. The other fields shown in the example each contain contact information for that user. These fields may include Phone (Business), Phone (Home), Phone (Mobile), Fax, Pager, E-Mail (Primary), E-Mail (Secondary), and Instant Messaging Address. Other types of contact information, such as a Skype address, for example, may also be provided. As will be described in detail below, the notification client software 68 allows the user 10 to select recipients 28 from the contacts database 66 to receive a notification message from the notification service 12. The user 10 may select one or more of the available contact addresses/numbers for the message delivery.

Figure 5:
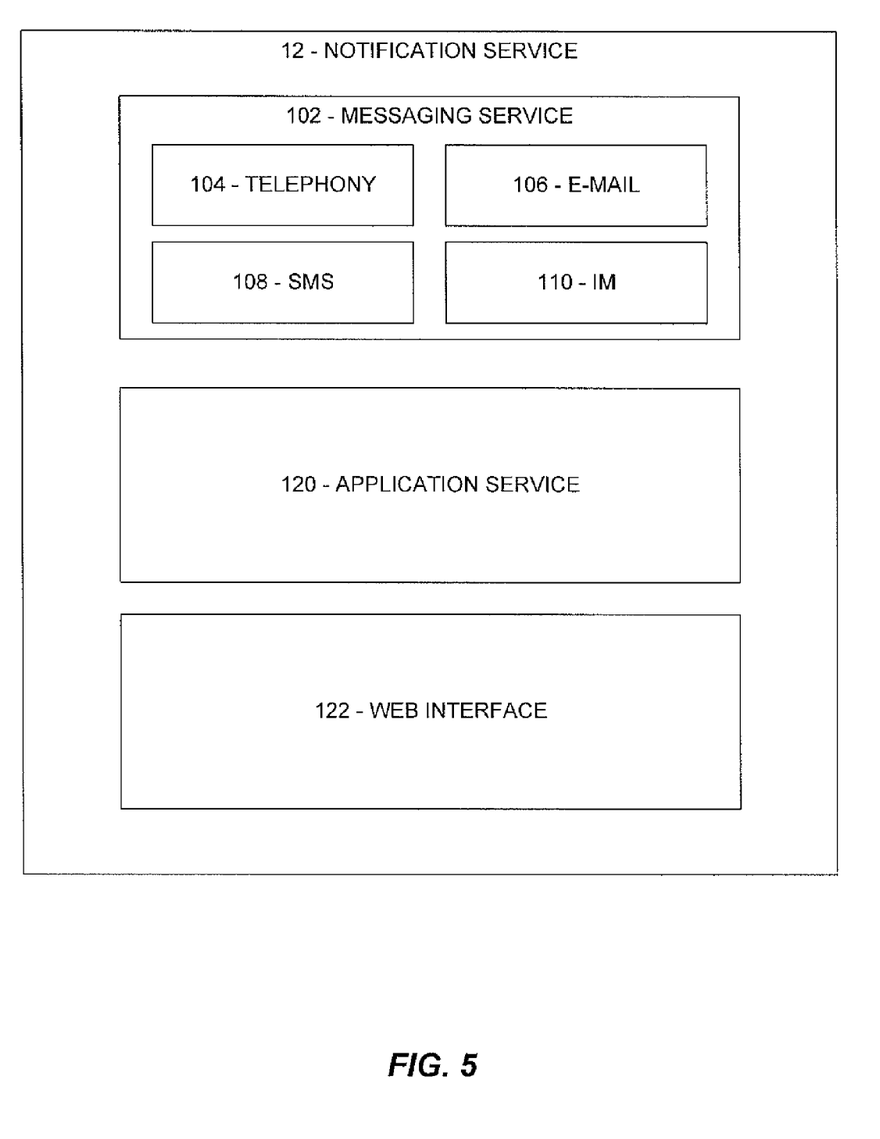
FIG. 5 is a more detailed block diagram view of the notification service from FIG. 1.

Referring now to FIG. 5, a more detailed view of the notification service 12 is provided. As noted above, the notification service 12 provides a platform which may be used by user 10 to send message notifications to a group of recipients 28 selected from the contacts database 66. In some embodiments, the notification service 12 is offered to the user 10 on a subscription basis. Thus, different levels of service and functionality may be made available to the user based on their subscription plan.

Notification service 12 includes a messaging service 102. The messaging service 102 is used to distribute notification messages to notification message recipients 28. Because the notification messages may be sent to notification message recipients 28 at any of their various contact addresses, the messaging service includes various modules which enable messages to be passed along the different networks 20 which are associated with the various contact items.

In one embodiment, the user 10 may specify that an initiated message be sent to an e-mail address for a first notification recipient 28, but sent as a text message to a second notification recipient 28, and sent as a voice message to a third message recipient 28. In other embodiments, however, a simplified user experience is provided which does not allow the user 10 to specify these settings and the notification service 12 routes the messages according to a protocol defined therein. In this simplified embodiment, the user 10 may specify overall settings that govern the types of devices that may receive a message, for example, by restricting delivery to voice devices only or by limiting delivery to text devices only, etc. In order for the message to be successfully delivered to each of the three recipients, the notification message may be routed through the IP network 26 to reach the e-mail recipient, while it is routed through the PSTN network 24 and cellular network 22 to reach the telephone and text messaging recipients, respectively. To provide the ability to deliver messages in this manner, the messaging service 102 may include a telephony module 104. The telephony module 104 is configured to deliver messages over the PSTN network 24 (it should be understood that the telephony module 104 may be implemented exclusively by means of VoIP technology and that, in this particular example, the telephony module 104 may be indirectly coupled to the PSTN network 24 by means of the IP network 24 or by means of a separate IP network reserved exclusively for VoIP communications). The messaging service 102 may further include an e-mail module 106 which delivers the notification messages to e-mail addresses for notification recipients 28 via the IP network 24. Additionally, the messaging service 102 includes a SMS module 108 which delivers text messages to recipients via the cellular network 22. In some embodiments, the messaging service may further include a instant messaging (IM) module 110 which allows the text messages to be delivered to an instant messaging address. Other messaging modules are also possibly such as a VOIP module which delivers messages a VOIP address (such as Skype).

The notification service 12 also includes an application service 120. The application service 120 is used to receive notification messages which have been initiated by the user 10, and to transform them (if necessary) into a form which can be delivered by the messaging service 102. The operation of the application service 120 is described in additional detail below. Notification service 12 also includes a web interface 122. The web interface 122 provides browser-based access to the application service 120. Thus, while some versions of the notification client software 68 may be client-server based, other versions may be browser-based.

Figure 6:
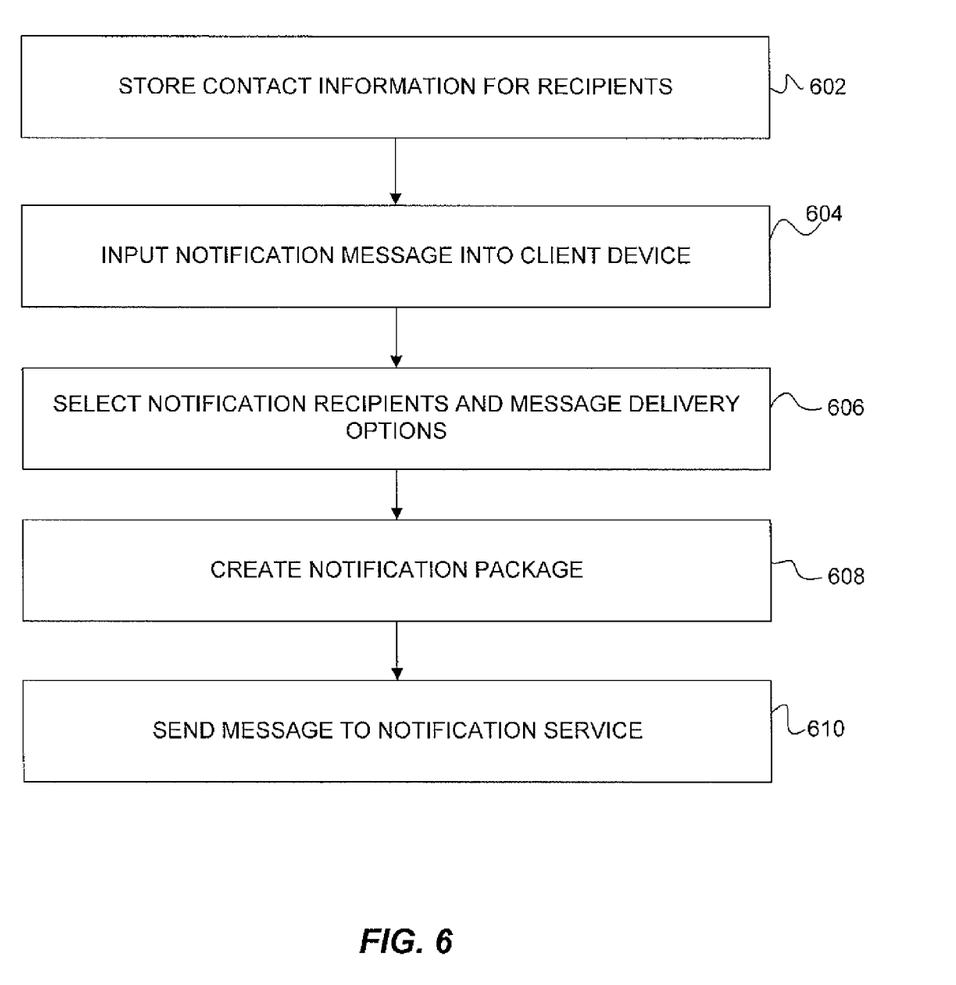
FIG. 6 is a flowchart illustrating the initiation of a notification to a group of recipients in accordance with one embodiment.

Referring now to FIG. 6, a flow diagram illustrates how the notification client software 68 may initiate a notification message. The process begins at block 602, where the client device 40 stores contact information for recipients. As noted above, the contact information may be stored in the contacts database 66. In some embodiments, the contacts may be grouped into predefined groups for ease of selection. These groups may be maintained by the contacts database software 66, the notification client software 68, or both. For example, a user 10 may define a group "soccer team" so that they can easily select this group to send a notification without having to scroll through the contacts database 66 to select the relevant ones.

Next, at block 604, the user inputs a notification message into the client device 40. The notification message is typically a voice message which is input via the audio input 54 and stored in the data storage 48. The client notification software 68 may include this voice recording functionality, or it may be provided alternatively by the operating system software 60 or the application software 62 of the client device 40. The notification message may also take the form of a text message input by the data input device 46 (and later converted to a voice format using Text-to-Speech technology if necessary or desired).

The process then moves to block 606, where the user selects the group of notification recipients for the inputted message and also specifies the message delivery options within the client software 68. As noted above, the user 10 may select a predefined group of notification recipients 28 from the contacts database 66, or they may select the notification recipients 28 manually. As noted previously, a particular notification recipient 28 may have more than one associated contact number or address. In some embodiments, the notification service 12 may handle the selection of which address to utilize for contacting a user in order simplify the user interface. In other embodiment, the user might be asked to select a notification method that applies to all notification recipients. In still other embodiments, the notification client software 68 may be configured to allow the user 10 to specify which of the contact destinations for each notification recipient 28 should receive the message being initiated by the user 10. For example, for a first notification recipient 28, the user 10 may wish for the message to be delivered to the recipient's telephone number. For a second message recipient, the user 10 may select his e-mail address at the delivery location. In some embodiments, the notification service settings 70 may store default preferences for the user 10. In some embodiments, the user 10 may also be permitted to select a primary delivery location for each notification recipient 28 and a secondary delivery location (address) to try if the notification recipient 28 does not respond to the message sent to the first delivery address. Alternatively, the notification service 12 may handle device delivery selection without input from the user. For especially urgent messages, the user 10 may specify that the notification message be sent to all available delivery locations for a notification recipient 28. Specifying this option results in the message being sent to each contact option for that notification recipient 28.

Although various embodiments have been described with respect to how the notification recipient may be selected, a skilled artisan will appreciate that in general, the user may choose the notification recipients 28 or groups to be contacted, and the devices that may be contacted for the purpose of transmitting the notification message. On receipt from the user 10, the notification service sends the notification to the recipients and may select devices for each recipient in a manner of its choosing. A skilled artisan will further appreciate that multiple strategies may be applied to deliver the notification message—e.g. contact via only one device at a time and stop on the first positive contact, contact via all available devices for a given person, etc.

In specifying message delivery options, several options may be available. The user may specify whether the notification service 12 is to obtain a confirmation that the message has been received and understood by the notification message recipients 28. In some embodiments, additional delivery options may be specified by the user 10. For example, the user 10 may wish to have an additional question be asked of the message recipients 28 upon receiving the notification message. The additional question might be, "Would you like to reschedule our meeting?", or some other question. The user 10 may also specify whether the additional question should be presented to the notification recipients 28 as voice message or a text message. Another option that may be available to the user 10 is to specify whether the notification results should be communicated to the user 10. These results may be e-mailed to the user 10 directly, or they may be stored on the web interface 122 of the notification service 12 where they can be accessed at a later date via a web browser. Some embodiments may further include options that allow the user 10 to specify that the notification recipients 28 reached by telephone be transferred into a conference bridge once they have received and responded to the message (this process is described in further detail below).

Another option which may be offered by the notification client software is the ability to specify message origination information to the notification recipients 28. This service may be provided utilizing built-in functionality provided by various communication protocols such as ISDN or VoIP, for example, which permit the call originator to specify the originating number for an outgoing call. Using these features, it is possible to originate a call from the notification service 12 that caller ID will indicate that it comes from the sender's mobile phone. This allows the user 10 to ensure that the notification recipients 28 can quickly and easily recognize the notification originator as the user 10. Moreover, additional sending options may be provided such as allowing the user 10 to specify that the message be delivered at a specific time. As noted above, in some embodiments, the notification service 12 may be provided on a subscription basis to the user 10. Thus, the above-described notification options may be offered based on the level of service subscribed to by the user 10.

Once the notification recipients 28 and message delivery options have been selected and specified by the user 10, the process moves to block 608, where the notification client software 68 creates a notification package to send to the notification service 12. As used herein, a notification package refers to one or more files which contain data used in the notification process. The notification package may include the voice recording, the specified notification options, and the recipient information associated with the notification message. Although the notification package in one embodiment may be an XML package, a skilled artisan will readily appreciate that various other data formats (such as JSON, structured text, binary, et al.) may be used. Once the notification package has been created, the process moves to block 610 wherein the notification client software instructs the operating system 60 and/or one of the network interfaces 50 or 52 of the client device 40 to transmit the notification package to the notification service 12.

Figure 7:
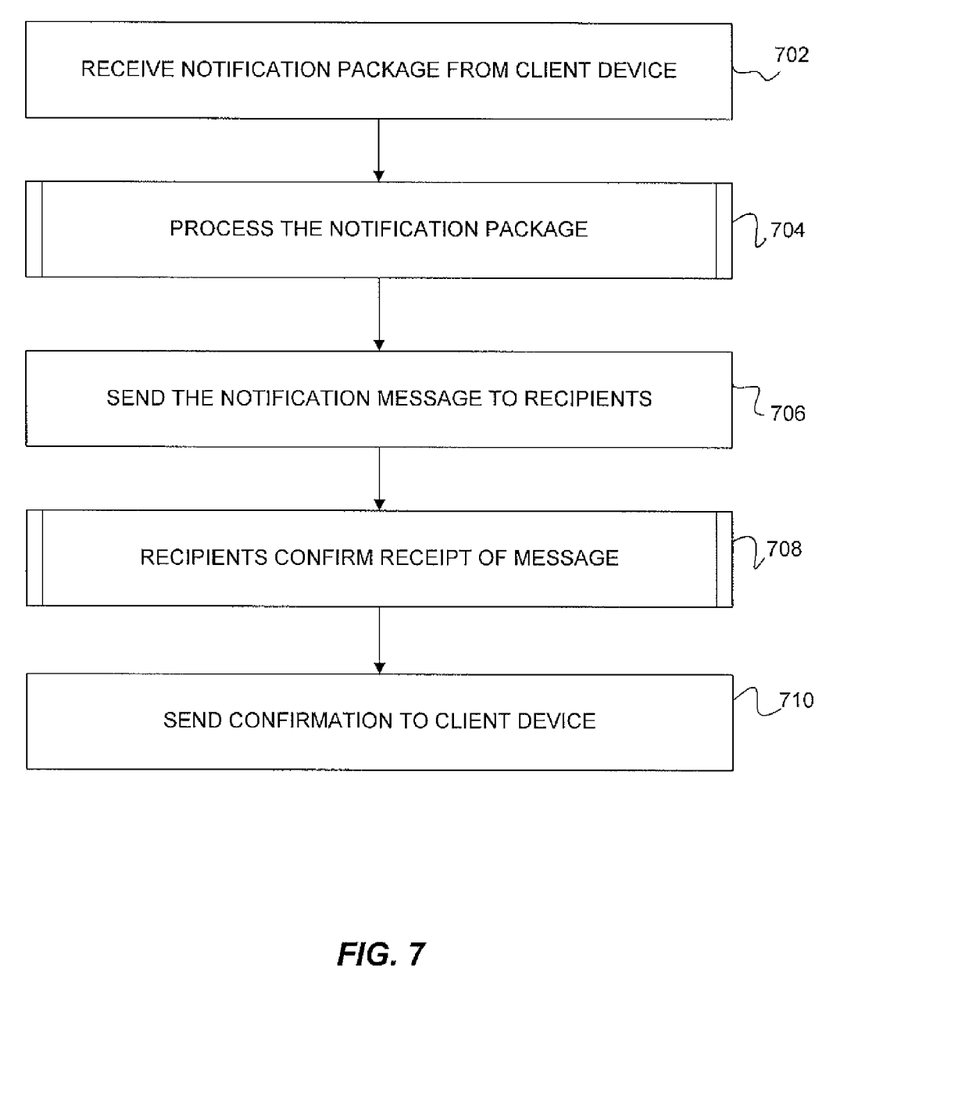
FIG. 7 is a flowchart of the process by which the initiated notification message from FIG. 6 is distributed to a group of recipients.
Figure 8:
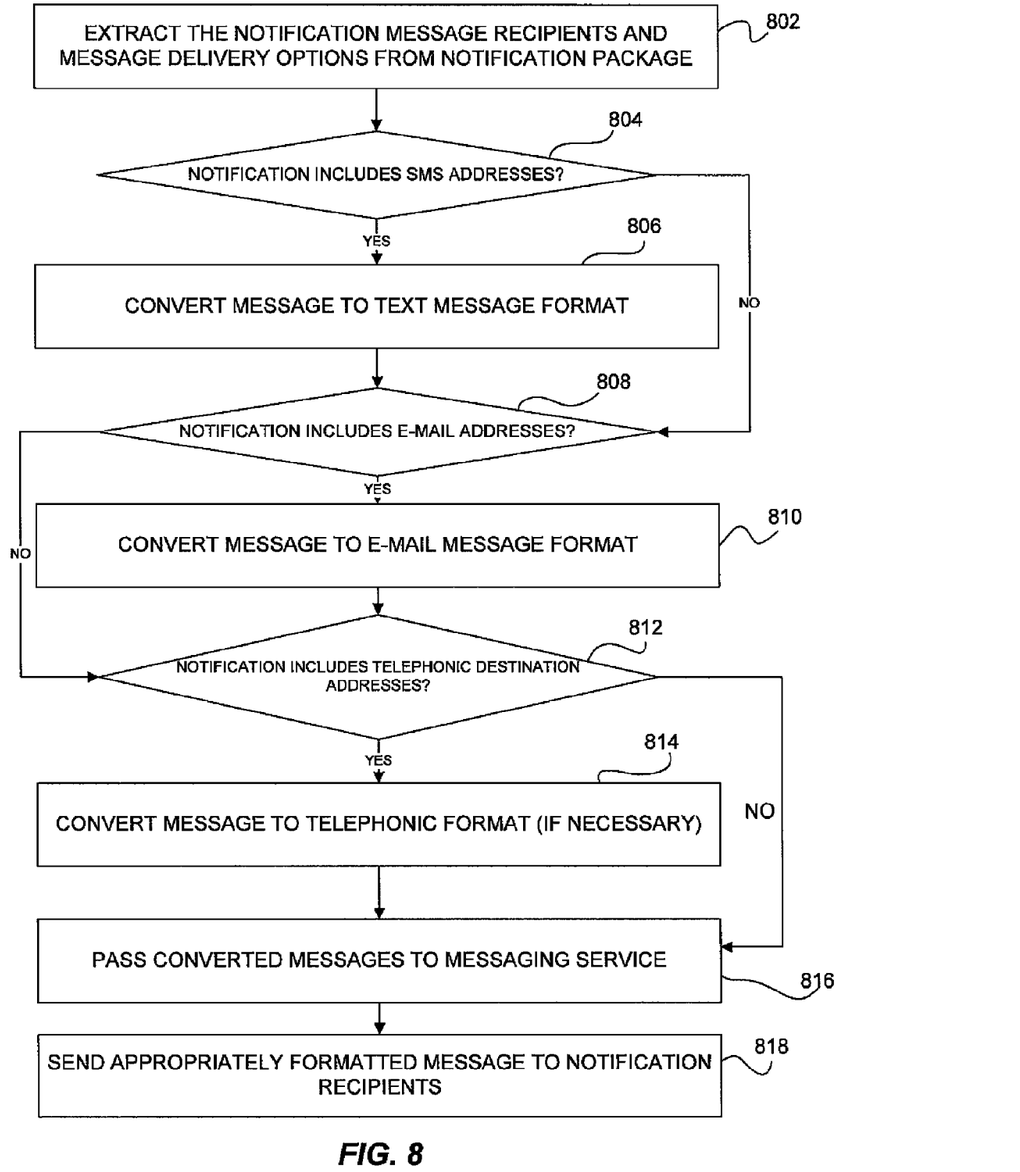
FIG. 8 is a flowchart illustrating in greater detail how the notification package of FIG. 7 is processed.

Once a notification package has been received by the notification service 12, it is then delivered to the specified notification recipients 28. FIGS. 7 and 8 describe this process in greater detail. Referring to FIG. 7, a flowchart is provided that illustrates how the notification service 12 may receive and process the notification package in accordance with one or more embodiments. The process begins at block 702, where the notification service 12 receives the notification package from the client device. Typically, the generated notification package is received into the application service module 120 of the notification service 12. Next, the process moves to block 704 where the notification package is processed by the application service module 120 and the notification message and notification recipients 28 are extracted from the notification package (described in detail in connection with FIG. 8).

Once the notification package has been processed, the notification message is sent to the notification recipients 28 at block 706. Typically, the process of sending the message is carried out by the messaging service 102. For each recipient address extracted from the notification package, the messaging service 102 may determine if the message should be routed via the telephony module 104, e-mail module 106, or the SMS module 108. Thus, if the address for the notification recipient 28 is a telephone number, then the voice recorded notification message may be sent via the telephony module 104 over the PSTN 24 to the notification recipient's telephone number. Similarly, if the address for a notification recipient 28 is an e-mail address, the messaging service 102 passes the text version of the notification message to the e-mail module 106 which sends the notification message to the notification recipient 28 via the IP network 26. If the address is an instant messaging address, the notification message is passed to the IM module 110, where it is delivered to the notification recipient 28 at that time.

When the notification recipients 28 receive the notification message from the messaging service 102, their confirmation of receiving the notification is then returned to the notification service 12 at block 708. The notification service 12, upon receiving the message, then sends the confirmation to the user 10 over the network 20 at block 710. The confirmation may be delivered to the user 10 in various ways. In one embodiment, the notification service 12 may send the user 10 an e-mail message each time a notification recipient 28 confirms receipt of the message. In some embodiments, the email message is send at a defined interval (perhaps ten or fifteen minutes) after the notification has been sent. The e-mail message may be resent again every ten or fifteen minutes until all contact attempts had been exhausted. Alternatively, the notification service may store the receipt confirmations and make then available to the user 10 via the web interface 122.

FIG. 8 is a flowchart providing a more detailed illustration of how the notification package is processed to for proper delivery in block 704 of FIG. 7. Processing of the notification package may be accomplished utilizing a system such as that described in co-assigned U.S. Pat. No. 6,463,462, the disclosure of which is incorporated by reference herein in its entirety. The procedure begins at block 802, where the application service extracts the notification message (which is typically a voice recording, but may be a written message, or may be both a recorded voice message and a text message), the notification message recipients, and the notification delivery options from the notification package generated by the user 10 on client device 40. As noted previously, the notification package may take the form of an XML package. Once the various files have been extracted from the notification package, the application service 120 then proceeds to determine whether the notification recipients 28 specified in the notification package include SMS addresses at block 804. If there are SMS addresses specified, the process moves to block 806, and the notification message may be converted to a text messaging format for distribution as an SMS message. Voice may be converted to text via a number of commercially available technologies whose capabilities range from recognition of discrete words to transcription of continuous free-form speech. These technologies typically accept a digital stream representing the audio input and emit a stream of transcribed text. Once the transcription is completed, either by the server or by the user's mobile device, the message may be presented to the user for review and editing. In some embodiments, voice-to-text technology may not be available.

In these embodiments, the user 10 may receive a warning that the message cannot be delivered to text-only devices without a text message. The user may then either add text or may remove text devices from the list of candidate devices. It should be noted that if the notification message received from the user 10 was received in a text format, a conversion may not be necessary. Moreover, in order to preserve the original message received from the user 10, the notification message may first be copied, and the copied message may be converted to the SMS format. After the conversion is completed, the process moves to decision block 808.

If there are no SMS addresses specified at decision block 804, the process skips block 806 and jumps to decision block 808, where the application service 120 determines whether the notification recipients 28 included in the notification package include e-mail addresses. If e-mail addresses are included, at block 810 the notification message is converted into a format appropriate for distribution by e-mail (which may be the same or a different format than the SMS format) and moves to decision block 812. If no e-mail addresses are specified in the notification package at decision block 808, the process skips block 810 and jumps to decision block 812, where the application service 120 determines if the notification recipients 28 include telephone addresses (e.g., telephone numbers). If telephone numbers are included, the process moves to block 814, where the notification message is converted to a voice message format, if necessary. Depending on the format of the notification message as input by the user 10 into the client device 40, this conversion may not be necessary. If the user 10 input the notification message as a voice recording using the audio input 42, then the notification message may already be properly formatted for distribution via the telephony module 104. If no telephone numbers are specified for the group of notification recipients associated with the notification message, the process jumps to block 816. At block 816, the application service 120 passes the generated versions of the notification message to the messaging service 102 along with instructions for their delivery (e.g., the delivery addresses for the notification recipients). The messaging service 102 receives the various versions of the notification message and delivers them to their respective notification recipients 28 using submodules telephony module 104, e-mail module 106, SMS module 108, and/or IM module 110.

The delivery of the notification package by the messaging service 102 may be accomplished in utilizing various technologies. Typically, the messaging service 102 constructs a list of all recipients and each of their eligible contact addresses (received from the application service 120 as described above). As noted previously, the eligible addresses received from the client device 40 may specify a ranking or order—meaning each eligible address is associated with a rank indicating the order in which it should be attempted relative to the other possible addresses for that notification recipient 28. An associated record may also be constructed that contains the information relevant to the delivery of the outgoing message, including the text of the message (if available) and the recorded voice for the message (if available) and the message delivery options specified as described above.

Once this information is constructed, the messaging service 102 selects all "ready" recipients from the table of recipients and select the next available device, in rank order, for each given recipient. These addresses are supplied to the relevant messaging module (e.g. phone addresses are bound to the telephony module 104, email addresses will be bound to the email module 106, etc.) along with either the content of or a reference to the record for this notification. Each messaging module 104, 106, 108, and 110 may then use the information that it receives to perform the requested notification to the relevant device. Processing the message in a manner appropriate for delivery via each individual messaging module may be carried out for example utilizing methods described in co-assigned U.S. Pat. No. 6,463,462 or, for text devices such as email, two-way paging, or instant messaging, through a series of "query/response" message exchanges. A skilled artisan will appreciate that there are many methods to present properly formatted information to the messaging modules.

When an address for a given recipient is provided to a specific messaging module for notification, that recipient may be flagged as busy in the messaging service 102. When the attempt has been completed, the device may be flagged with the attempt number just completed. If, during the foregoing attempt, any human response was detected (whether positive or negative) by the messaging service 102, some or all of the responses during the exchange may be recorded to a response table stored in a database, and the notification recipient 28 may be flagged as contacted so that there are no further attempts to contact that individual. If, during the foregoing attempt, no human response was detected, the recipient may be flagged as attempted so that he is once again ready to be contacted.

When, for a given attempt cycle, each of the devices for a given recipient has been attempted once, the attempt number may be compared to the maximum number of attempts associated with the message. If the attempt number is less than the maximum number of attempts, then the recipient may be flagged as delayed and marked with a delay time equal to the current time plus the delay between attempts value associated with the message (from the user's preferences 70). A parallel process may periodically inspect all recipients in a "delayed" state and, when the current time exceeds the recipients delay time, the recipient may be once again flagged as available.

When all devices for a given recipient have been attempted the maximum number of times (as determined by the user's 10 preferences 70 stored in the device 40) then that recipient will be flagged as failed. When all recipients associated with the message have been flagged as contacted or failed then the message will be flagged as complete so that neither it nor its recipients need be considered for notification in the future. Information associated with the message, actions taken, and responses received will be written to a set of "billing" tables for report generation and information will be removed from any "processing" tables once delivery of the message is complete).

Figure 9:
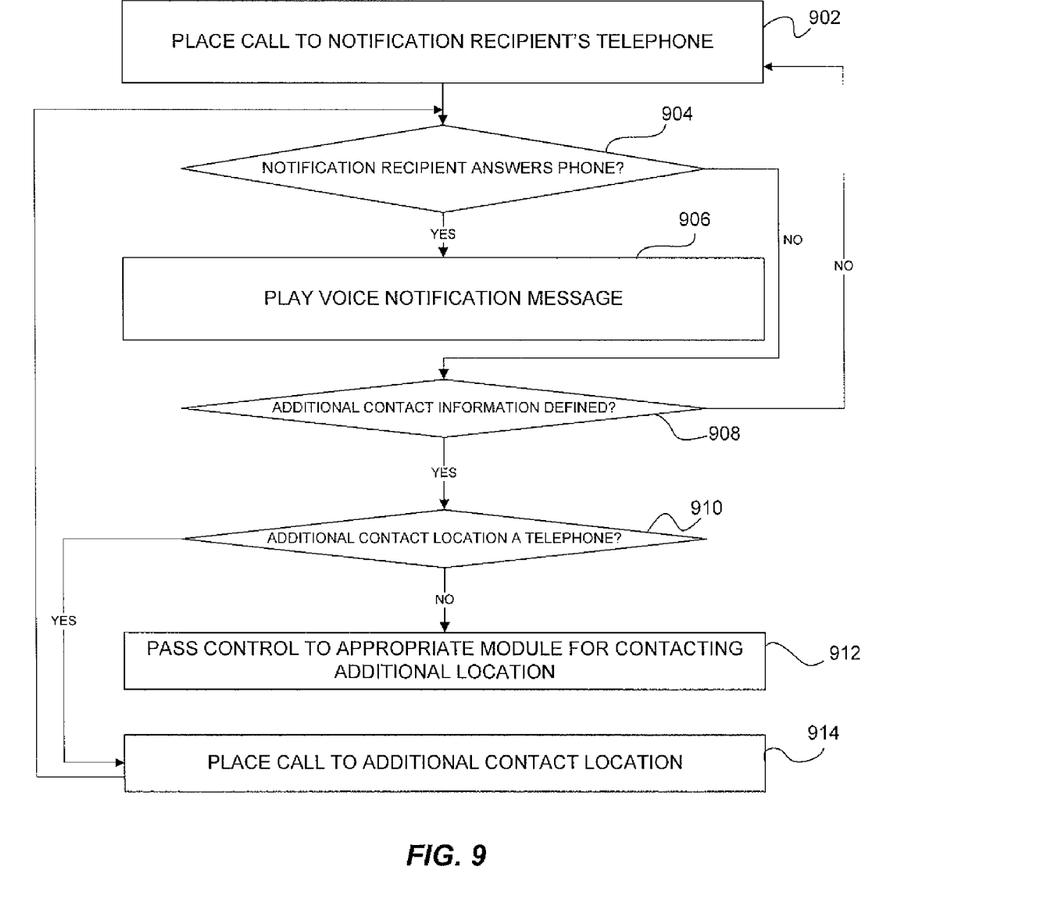
FIG. 9 is a flowchart of the process by which multiple recipient addresses may be contacted to deliver a message.

FIG. 9 provides an example of how the telephony module 104 may deliver a notification message to a notification recipient 28. At block 902 the telephony module 104 places a call to the notification recipient's 28 telephone number. Next, at decision block 904, the telephony module 104 determines whether the dialed notification recipient 28 has answered the phone. If the notification recipient 28 has answered the phone, the process moves to block 906, and the telephony module 104 plays the notification message as a voice message to the notification recipient 28.

If the notification recipient does not answer the phone at decision block 904, the process instead moves to block 908, where the notification service 12 determines whether additional contact information has been defined. For example, the user 10 may have selected two different phone numbers for the notification recipient 28, or he might have selected an e-mail address as an additional delivery location for the notification recipient 28. If no additional contact information has been provided by the user 10, then the process returns to block 902 and the telephone number of the notification recipient 28 is dialed again.

If an additional contact is provided for the notification recipient, the process moves instead to decision block 910, where the system determines if the additional information is a telephone number to be handled by the telephony module 104. If so, the process moves to block 914 where the telephony module 104 tries to dial the additional telephone number for the notification recipient 28 and the process then returns to decision block 904. If the additional contact provided for the notification recipient 28 is not a telephone number, control is passed the telephony module 104 to the appropriate messaging module to deliver the notification to the additional address at block 912. For example, if the additional address is an e-mail address, the control is passed to the e-mail module 106 so that it can deliver the message to the specified e-mail address.

Figure 10:
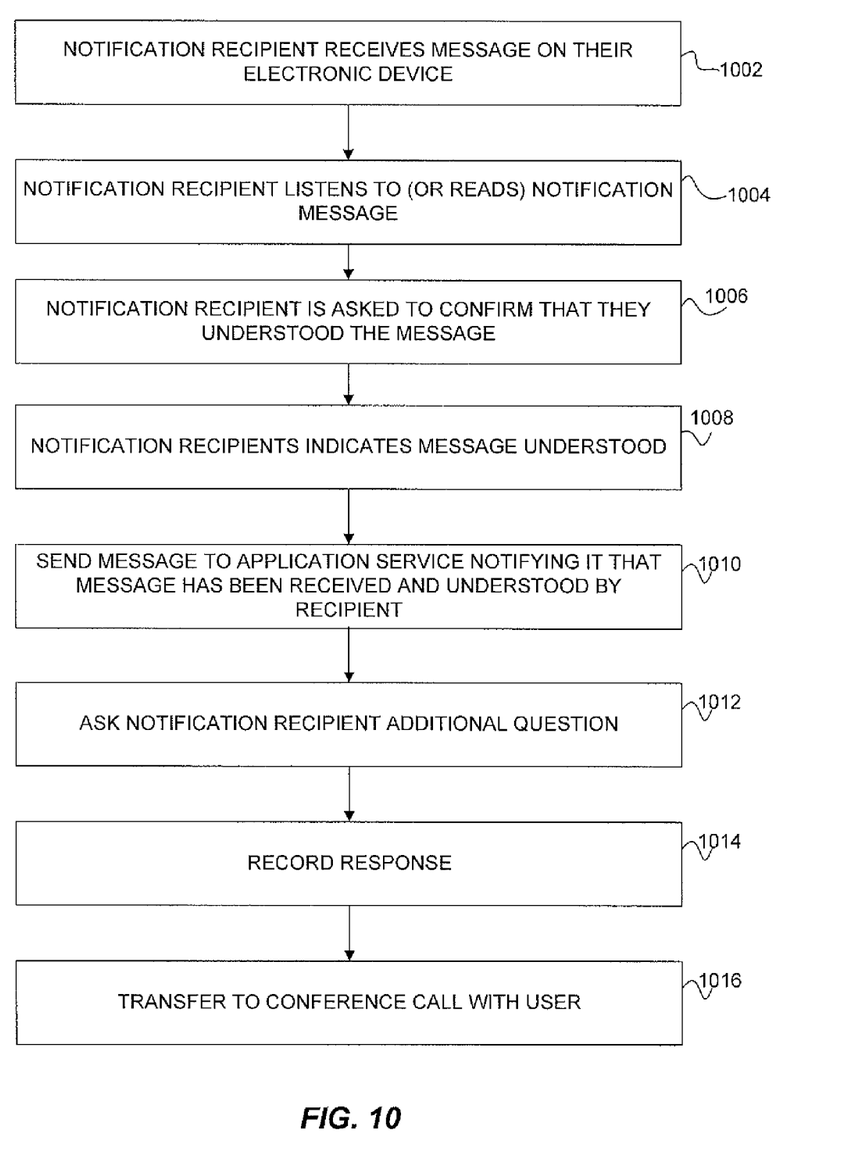
FIG. 10 is a flowchart illustrating in greater detail how message recipients may confirm receipt of the message in FIG. 7.

As noted above in connection with FIG. 7, the user 10 may request that the notification recipient 28 confirm receipt of the notification message sent to them. FIG. 10 is a flowchart which provides an illustration of how the notification recipients 28 may be prompted to confirm receipt of the message and additional messaging capability may be implemented in response to that confirmation.

Beginning at block 1002 a notification recipient 28 receives the notification message from the notification service 12 on one of their electronic devices. Next, the notification recipient 28 listens to or reads the notification message to learn its contents at block 1004. Upon learning the contents, the user is prompted to provide an indication that they understood the contents of the message at block 1006. If the message is a telephone message, and the notification recipient has answered a telephone call placed by telephony module 104 of the messaging service 102, then the notification recipient may be prompted to press a specific key on their telephone keypad to indicate a response. For example, at the end of the message, the notification recipient 28 may hear a message that states, "Press '1' if you understand this message." Alternatively, if the message is delivered in e-mail format or text messaging format, the notification recipient may be prompted to respond via a message reply, or via an HTML button or an HTML link at the bottom of the email message.

Next, at block 1008, the notification recipient 28 indicates that the message has been understood. This indication is received by the messaging module 102 that in turn may notify the application service 120 that the message has been received by the notification recipient 128 and understood by the notification recipient 128.

In some embodiments, the user 10 may have specified an additional question to be presented to the notification recipient 28 upon their confirmed receipt of the message. In these embodiments, the process then moves to block 1012, where the notification recipient 28 is asked the additional question. When the notification recipient 28 responds to the additional question, the application service 120 records the response (to later make available to the user 10 who initiated the notification message). When the response to the additional question has been recorded, if the message has been delivered via a telephone call to the notification recipient, the application service 120 may then transfer the notification recipient into a conference call with the user 10. The transfer into the telephone conference call may be provided by the telephony module 104 which may be located behind a switch or central office that supports call transfers. For a VoIP-based telephony module, SIP or other IP-based technology (or similar) technology may be used to facilitate reassignment of a call's "audio path" to an alternate termination point. In the event that a conference bridge is required, the call may be transferred either to a 3rd party conferencing service or to a "conference bridge" technology that is directly coupled to the notification service 12. In the case of SMS or HTML notification, the notification service 12 may be configured to pass a link or a phone number that the recipient may use to connect directly to the "conference bridge" technology or service It will be understood by those of skill in the art that numerous and various modifications can be made without departing from the spirit of the present invention. Therefore, it should be clearly understood that the forms of the invention are illustrative only and are not intended to limit the scope of the invention.

What is claimed is:

1. A system for sending and verifying receipt of a notification message to a plurality of recipients over a computer network comprising:
    a first processor including a first module, the first module operable to:
        store contact details of potential recipients of the notification message including at least one address of the potential;
        store a voice recording;
        receive data identifying one or more of the potential recipients as intended notification message recipients from a first communication device;
        receive data identifying at least one contact destination for the intended notification message recipients from the first communication device;
        assemble the notification message recipients, the at least one contact destination, and the stored input voice recording into a notification package; and
        transmit the notification package to a second processor in communication with the first processor, the second processor being at a different location than the first communication device;
    the second processor including a second module to:
        receive the notification package from the first module;
        extract, from the notification package, information associated with at least one of the intended notification message recipients for notification recipients having common delivery characteristics, the at least one contact destination, and the stored input voice recording from the notification package;
        determine whether the stored input voice recording needs to be converted to a different format based on, at least in part, the at least one contact destination and the common delivery characteristics, and independent of input from a sender of the notification message directed to a delivery format;
        convert the stored input voice recording to the different format for the notification recipients having common delivery characteristics;
        transmit at least a portion of the stored input voice recording to the at least one address associated with the one or more intended notification message recipients based at least in part on notification recipient specified delivery parameters;
        receive data from one or more of the intended notification message recipients indicative of confirmation that the message was received; and
        send the data indicative of confirmation that the message was received to the first module.

2. The system of claim 1, wherein the data received from one or more of the intended notification message recipients is further indicative of confirmation that the message was understood.

3. The system of claim 1, wherein the stored voice recording sent to the at least one address associated with the one or more intended notification message recipients is sent via a voice telephone call.

4. The system of claim 3, wherein the first module is further operable to receive data identifying message delivery options from the first communication device, the message delivery options comprising an option to include one or more of a question or command to which the notification message recipients are prompted to respond.

5. The system of claim 4, wherein the second module is further operable to receive the response provided by the notification message recipient to the question and send data related to the response to the first module.

6. The system of claim 3, wherein the second module is further operable to transfer a plurality of the notification message recipients into a conference call with a device associated with the first module.

7. The system of claim 1, wherein sending the data indicative of confirmation that the message was received to the first module is in response to a query from the first module submitted to the second module.

8. The system of claim 1, wherein the input voice recording sent to the at least one address associated with each of the one or more intended notification message recipients is sent to at least one e-mail address of at least one notification message recipient.

9. A method of distributing an electronic message from a first device to a group of recipients over a network, the method comprising:
    receiving a notification package, the notification package comprising:
        data indicative of the electronic message to be distributed from the first device;
        the group of recipients of the electronic message;
        at least one contact destination for at least one recipient in the group of recipients of the electronic message;
    extracting information associated with at least one of the recipients for recipients having common delivery characteristics, the at least one contact destination, and the data indicative of the electronic message to be distributed from the notification package;
    determining whether the electronic message needs to be converted to a different format based on, at least in part, the at least one contact destination and the common delivery characteristics, and independent of input from the first device directed to a delivery format;
    converting the electronic message to the different format for the recipients having common delivery characteristics; and
    sending the electronic message to at least one recipient in the group of recipients based at least in part on notification recipient specified delivery parameters, wherein the electronic message comprises data which prompts the recipient to confirm their review of the electronic message.

10. The method of claim 9, further comprising receiving confirmation of review of the sent electronic message by the recipients on a per recipient basis based on the recipient confirming review of the electronic message.

11. The method of claim 9, wherein the data indicative of an electronic message is text.

12. The method of claim 11, wherein the text is converted to a voice message and delivered as a voice message.

13. The method of claim 9, further comprising providing an interface for specifying the group of recipients to receive the electronic message, wherein providing the interface comprises displaying a list of potential recipients with a selectable checkbox for specifying certain ones of the potential recipients as the group of recipients.

14. The method of claim 13, further comprising providing a selectable option for specifying one or more address types for the specified certain ones of the potential recipients.

15. The method of claim 9, wherein receiving confirmation of review of the sent electronic message comprising receiving an e-mail including information related to whether the message was received and understood by the message recipients.

16. The method of claim 9, wherein the confirming the review of the electronic message comprises generating an e-mail message to a user associated with the first mobile device, the e-mail message including information about the outcome of the sending of the electronic message to the plurality of recipients.

17. The method of claim 9, wherein confirming the review of the electronic message provided by the recipient is a text response.

18. The method of claim 9, wherein the message further comprises contact instructions to include an additional question to pose to the plurality of recipients, and the method further comprises:
 including the additional question in the sent message notification;
 prompting the recipient to provide a response to the additional question;
 receiving a response to the additional question from one or more recipient; and
 transmitting data indicative of the response to the additional question to a user associated with the first device.

19. The method of claim 9, wherein the data received from one or more of the group of recipients indicative of confirmation that the message was received and understood comprises a voice response.

20. The method of claim 9, wherein the data received from one or more of the group of recipients indicative of confirmation that the message was received and understood comprises a DTMF tone.

21. The method of claim 9, further comprising connecting each of the confirmed recipients of the electronic message to a conference call bridge.

22. The method of claim 21, further comprising connecting the first device to the conference call bridge with the confirmed recipients.

23. A system for distributing an electronic message from a first device to a group of recipients over a network, the system comprising:
 means for receiving a notification package, the notification package comprising:
  data indicative of the electronic message to be distributed from the first device;
  the group of recipients of the electronic message;
  at least one contact destination for at least one recipient in the group of recipients of the electronic message;
 means for extracting information associated with at least one of the recipients for recipients having common delivery characteristics, the at least one contact destination, and the data indicative of the electronic message to be distributed from the notification package;
 means for determining whether the electronic message needs to be converted to a different format based on, at least in part, the at least one contact destination and the common delivery characteristics, and independent of input from the first device directed to a delivery format;
 means for converting the electronic message to the desired recipient format for the recipients having common delivery characteristics; and
 means for sending the electronic message to a notification service for distribution to the recipients in the specified group based at least in part on notification recipient specified delivery parameters, wherein the electronic message comprises data which prompts the recipient to confirm their review of the electronic message.

24. A non-transitory computer usable storage medium having computer readable program code embodied therein for distributing an electronic message from a first device to a group of recipients over a network, the computer readable code comprising instructions for:
 receiving a notification package, the notification package comprising:
  data indicative of the electronic message to be distributed from the first device;
  the group of recipients of the electronic message;
  at least one contact destination for at least one recipient in the group of recipients of the electronic message;
 extracting information associated with at least one of the recipients for recipients having common delivery characteristics, the at least one contact destination, and the data indicative of the electronic message to be distributed from the notification package;
 determining whether the electronic message needs to be converted to a different format based on, at least in part, the at least one contact destination and the common delivery characteristics, and independent of input from the first device directed to a delivery format;
 converting the electronic message to the desired recipient format for the recipients having common delivery characteristics; and
 sending the electronic message to a notification service for distribution to the recipients in the specified group based at least in part on recipient specified delivery parameters, wherein the electronic message comprises data which prompts the recipient to confirm their review of the electronic message.

* * * * *

UNITED STATES PATENT AND TRADEMARK OFFICE
CERTIFICATE OF CORRECTION

PATENT NO. : 8,166,126 B2  
APPLICATION NO. : 11/857364  
DATED : April 24, 2012  
INVENTOR(S) : Lorin Brooks Bristow and Harold Dean St. Clair Page 1 of 1

It is certified that error appears in the above-identified patent and that said Letters Patent is hereby corrected as shown below:

| Column | Line | |
|---|---|---|
| 11 | 35 | Change "recipients" to --recipient's--. |
| 13 | 41 | In Claim 1, after "module" insert --operable--. |

Signed and Sealed this  
Thirteenth Day of November, 2012

David J. Kappos  
*Director of the United States Patent and Trademark Office*